(12) United States Patent
Miki

(10) Patent No.: US 6,667,088 B2
(45) Date of Patent: Dec. 23, 2003

(54) OPTICAL RECORDING MEDIUM

(75) Inventor: Takeshi Miki, Tokyo (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 09/774,421

(22) Filed: Jan. 31, 2001

(65) Prior Publication Data

US 2001/0044000 A1 Nov. 22, 2001

(30) Foreign Application Priority Data

Jan. 31, 2000 (JP) .................................... P2000-022765

(51) Int. Cl.$^7$ ................................................. B32B 3/02
(52) U.S. Cl. .................... 428/64.4; 428/64.1; 428/65.6
(58) Field of Search ............................ 428/64.4, 64.1, 428/65.6

(56) References Cited

U.S. PATENT DOCUMENTS 5,965,286 A * 10/1999 Ohnuki et al. ............... 428/694
6,228,457 B1 * 5/2001 Ueno et al. ................. 428/64.1

* cited by examiner

*Primary Examiner*—Cynthia H. Kelly
*Assistant Examiner*—Lawrence D Ferguson
(74) *Attorney, Agent, or Firm*—Sonnenschein, Nath & Rosenthal LLP

(57) ABSTRACT

Information is recorded on or reproduced from an optical recording medium (10) with irradiation of light from the opposite side of a substrate (2). In this optical recording medium (10), a reflection layer (6) is deposited on the substrate (2). This reflection layer (6) is made of an AgPdCu alloy thin layer or an AgPdCuAl alloy thin layer. A surface roughness (Ra) of this reflection layer (6) is less than 0.75 nm. A dielectric layer (3) is deposited on this reflection layer (6), and a heat control layer (1) is deposited on this dielectric layer (3). This heat control layer (1) is made of an AgPdCu alloy thin layer. A surface roughness (Ra) of this heat control layer (1) is less than 0.75 nm. A recording layer (4), a dielectric layer (5) and an organic protection layer (7) are deposited on this heat control layer (1). This optical recording medium can improve heat characteristics and reduce a disk noise.

6 Claims, 3 Drawing Sheets

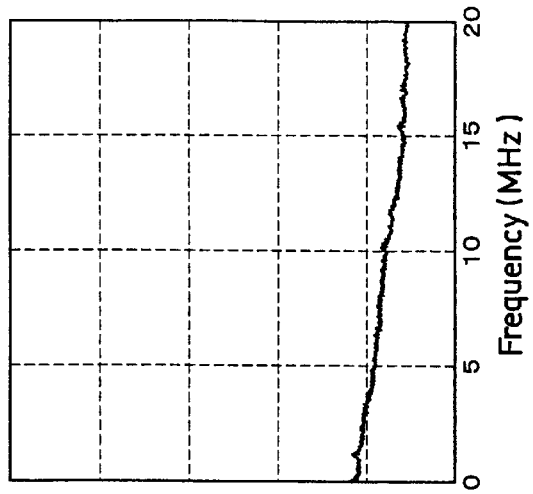
FIG. 3A  Heat Control Layer: AgPdCu
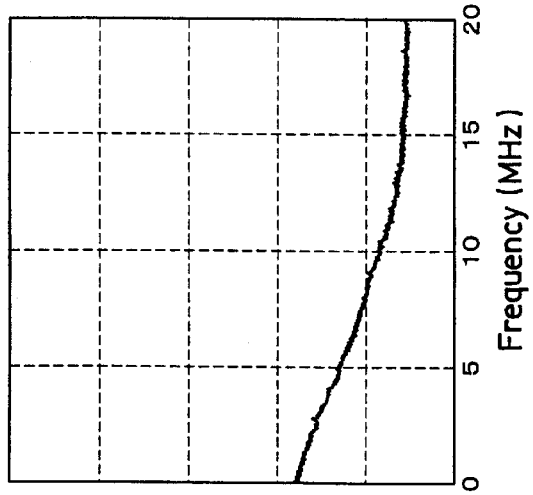
FIG. 3B  Heat Control Layer: Al
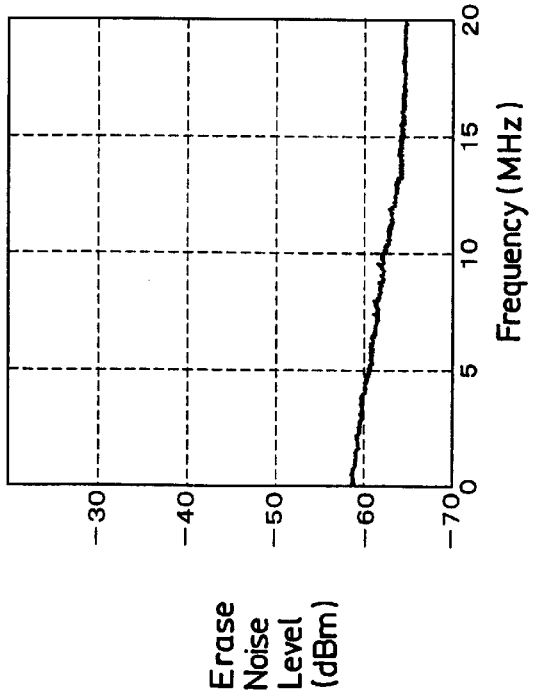
FIG. 3C  Without Heat Control Layer

OPTICAL RECORDING MEDIUM

RELATED APPLICATION DATA

The present application claims priority to Japanese Application No. P2000-022765 filed Jan. 31, 2000, which application is incorporated herein by reference to the extent permitted by law.

BACKGROUND OF THE INVENTION

1. Field of the Invention

The present invention relates to an optical recording medium.

2. Description of the Related Art

In recent years, optical recording mediums have received a remarkable attention as high-density recording mediums. Of conventional optical recording mediums, a magnetooptical recording medium, for example, includes a transparent substrate made of a suitable material such as polycarbonate on which a dielectric layer, a recording layer formed of a magnetic layer, a dielectric layer and a reflection layer made of a metal are laminated, in that order, and in which signals are recorded on/reproduced from the magnetooptical recording medium with irradiation of laser light from the transparent substrate side.

In this optical recording medium, in order to increase its recording density, it is intended to reduce a diameter of a spot of laser light by using short-wavelength laser light (blue laser light) or by using an optical system having a large numerical aperture (NA). In this case, an energy density of a spot of laser light on a recording layer increases considerably and a Kerr rotation angle θk obtained upon reproduction decreases. Then, there arises a problem that a signal characteristic will be deteriorated. The reason for this will be described below.

That is, when the recording layer is irradiated with laser light of high energy density, a temperature on the recording layer increases and the Kerr rotation angle ζk decreases. When a temperature on the recording layer increases more, a magnetic recording on the recording layer is lost so that the signal characteristic is deteriorated.

It has been reported that the above problem could be solved by directly depositing a heat control layer made of Ag, Al or the like on the recording layer at its surface opposite to the substrate to suppress a temperature rise on the recording layer (see U.S. patent application Ser. No.09/496,795).

In an ordinary magnetooptical recording medium which is recorded/reproduced with irradiation of laser light from the substrate side, the arrangement of layers is such one in which a substrate, a dielectric layer (SiN, etc.), a recording layer (TbFeCo, etc.), a heat control layer (Ag, Al, etc.), a dielectric layer (SiN, etc.) and a metal reflection layer (Al, etc.) are laminated, in that order. Specifically, since the heat control layer is laminated on the recording layer after the recording layer had been deposited on the dielectric layer, the heat control layer can be prevented from affecting the underlayer of the recording layer.

On the other hand, the following magnetooptical recording medium has been developed so far in order to effect a higher-density recording.

This magnetooptical recording medium is a so-called surface reading magnetooptical recording medium comprising a substrate on which a reflection layer, a dielectric layer, a recording layer, a dielectric layer and an organic protection layer are laminated, in that order, and in which signals are recorded/reproduced by irradiating and focusing laser light on the recording layer from the organic protection layer side opposite to the substrate through a lens system so that a space between the lens system and the recording layer can be reduced.

However, when the heat control layer is formed on this surface reading magnetooptical recording medium, the arrangement of layers is presented as shown in FIG. 1 in such a manner that a substrate 2, a reflection layer 6 (Ag alloy, etc.), a dielectric layer 3 (SiN, etc.), a heat control layer 1 (Ag, Al, etc.), a recording layer 4 (TbFeCo, etc.) and a dielectric layer 5 (SiN) are laminated, in that order. Consequently, the heat control layer 1 is deposited as the underlayer of the recording layer 4 and its surface roughness exerts an influence upon a disk noise. If the surface of the heat control layer 1 had been smoothed by reverse sputtering after the heat control layer such as Ag or Al was deposited, a satisfactory smooth surface would not be obtained.

When the heat control layer 1 is deposited on the recording layer 4 at its one surface opposing the substrate 2 side, the recording layer 4 is deposited on the heat control layer 1 after the heat control layer 1 was deposited on the dielectric layer 3 so that the heat control layer 1 is unavoidably deposited as the underlayer of the recording layer 4. As a result, if Ag, Al or the like is used as the material of the heat control layer 1, there then arises a problem that a disk noise such as an erase noise will increase due to the surface roughness of the heat control layer 1.

The above erase noise is such one generated when the magnetooptical recording medium is reproduced after a magnetization direction of the recording layer had been oriented in one direction with application of a magnetic field to one direction from the outside or such one generated when the magnetooptical recording medium is reproduced after the direction of the magnetic field applied from the outside had been reversed to that of the recording mode and laser light had been focused and irradiated on the magnetooptical recording medium or such one generated when the magnetooptical recording medium is reproduced after the direction of the magnetic field applied from the outside had been reversed to that of the recording mode and the recorded signal had been erased by focusing and irradiating laser light on the magnetooptical recording medium.

SUMMARY OF THE INVENTION

In view of the aforesaid aspect, it is an object of the present invention to provide an optical recording medium in which a heat characteristic can be improved and a disk noise can be reduced.

According to an aspect of the present invention, there is provided an optical recording medium in which a reflection layer is deposited on at least one substrate, a dielectric layer is deposited on the reflection layer, a heat control layer is deposited on the dielectric layer and a recording layer is directly deposited on the heat control layer and in which information is at least recorded or reproduced with irradiation of laser light from the opposite side of the substrate and in which the heat control layer is comprised of an AgPdCu alloy thin layer.

In the optical recording medium according to the present invention, a surface roughness Ra of the above heat control layer is selected to be less than 0.75 nm.

Further, in the optical recording medium according to the present invention, the surface roughness Ra of the above heat control layer is selected to be less than 0.75 nm and a surface roughness Ra of the reflection layer is selected to be less than 0.75 nm.

Furthermore, in the optical recording medium according to the present invention, the reflection layer is comprised of an AgPdCu alloy thin layer. Alternatively, the reflection layer is comprised of an AgPdCuAl alloy thin layer.

According to the present invention, there is obtained an optical recording medium in which the recording layer is directly formed on the heat control layer and in which information is recorded or reproduced with irradiation of laser light from the opposite side of the substrate. Since the heat control layer is comprised of the AgPdCu alloy thin layer, there can be obtained a heat control layer having a smooth surface as well as a high thermal conductivity.

BRIEF DESCRIPTION OF THE DRAWINGS

FIG. 3A is a characteristic graph of frequencies versus erase noise level obtained when a heat control layer is comprised of an AgPdCu alloy thin layer;

FIG. 3B is a characteristic graph of frequencies versus erase noise level obtained when a heat control layer is comprised of an Al alloy thin layer; and FIG. 3C is a characteristic graph of frequencies versus erase noise level obtained when an optical recording medium has no heat control layer deposited thereon.

DESCRIPTION OF THE PREFERRED EMBODIMENT

An optical recording medium according to an embodiment of the present invention will be described below with reference to FIG. 2 and FIGS. 3A to 3C.

Figure 1:
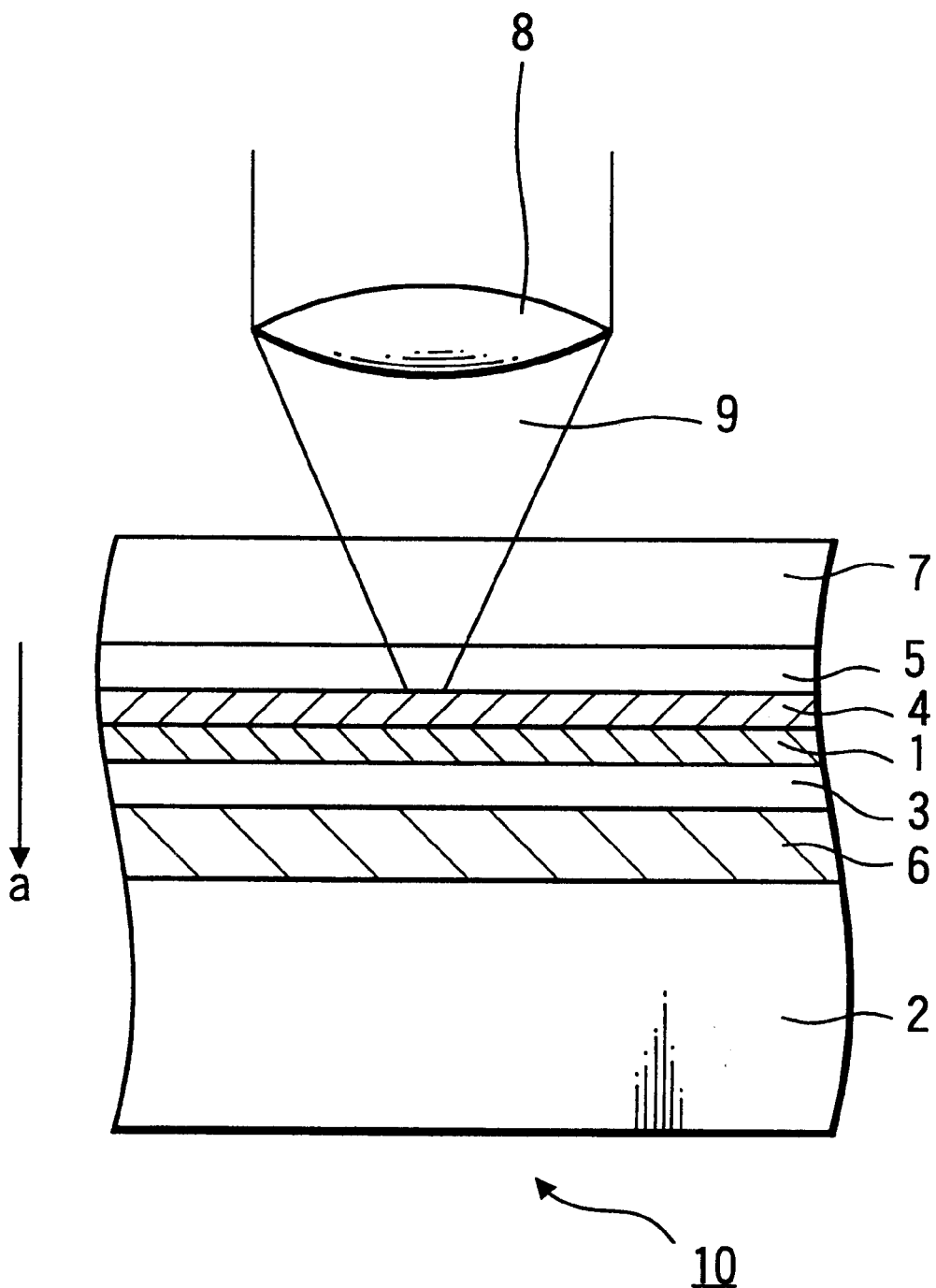
FIG. 1 is a cross-sectional view showing an example of a magneooptical recording medium according to the related art.
Figure 2:
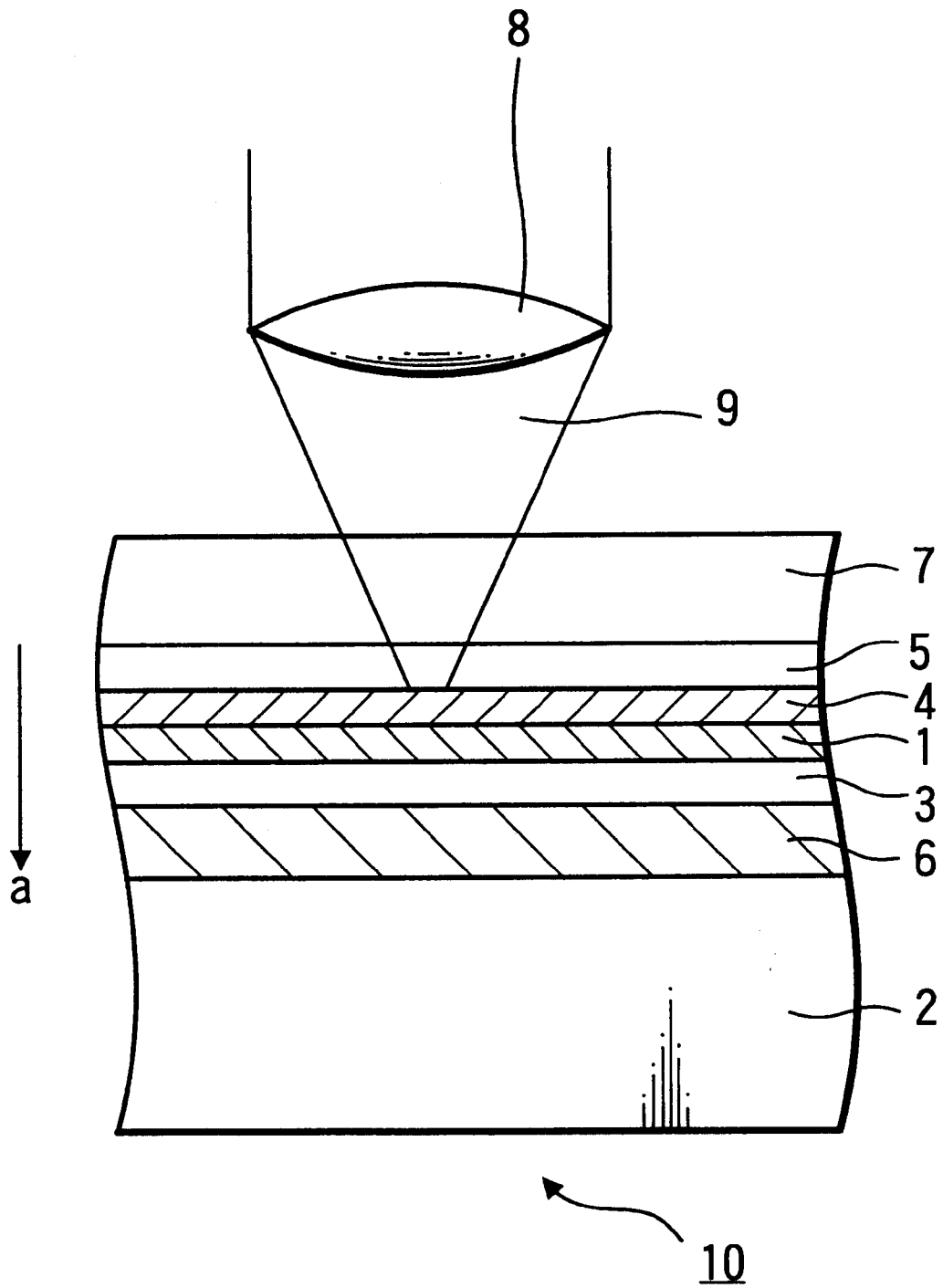
FIG. 2 is a cross-sectional view showing an optical recording medium according to an embodiment of the present invention.

FIG. 2 is a cross-sectional view showing an optical recording medium according to an embodiment of the present invention. As shown in FIG. 2, there is provided an optical recording medium 10 which is a MO (magnetooptical) medium comprised of a surface reading magnetooptical recording medium. As shown in FIG. 2, the optical recording medium 10 is comprised of a substrate 2, a reflection layer 6, a dielectric layer 3, a heat control layer 1, a recording layer 4, a dielectric layer 5 and an organic protection layer 7.

The substrate 2 is a disk-like substrate having a thickness ranging from 0.1 to 1.2 mm. This substrate 2 is made of a transparent material such as glass, polycarbonate, acrylic resin (e.g., poly(methyl methacrylate) (PMMA)) and epoxy resin. The material of the substrate 2 is not limited to the above transparent material and may be an opaque material. The substrate 2 has a function to support various thin layers laminated thereon.

The reflection layer 6 is deposited on the substrate 2. The reflection layer 6 is a thin layer having a film thickness ranging from 30 to 100 nm. The material of this reflection layer 6 is an Ag alloy such as AgPdCu and AgPdCuAl. The material of the reflection layer 6 is not limited to the Ag alloy such as AgPdCu and AgPdCuAl, and any other materials can be used as the material of the reflection layer 6 so long as they have a high reflectivity, a high thermal conductivity and a smooth surface property. The reflection layer 6 is comprised of a single layer of metal or alloy or a laminated layer formed of more than two layers of metal or alloy.

This reflection layer 6 has a function to reflect laser light passed through a recording layer (which will be described later on) so that reflected laser light may again pass through the recording layer.

The dielectric layer 3 is deposited on the reflection layer 6. This dielectric layer 3 has a film thickness less than 150 nm. The dielectric layer 3 is made of $SiO_2$, $SiO_2$ added with Tb, SiN, AlNx, $Y_2O_3$, $Al_2O_3$, ZnS or the like. This dielectric layer 3 has a function to prevent the recording layer, which is easily rusted, from being oxidized and also has a function to enhance an apparent Kerr rotation angle θk owing to effects of a multiple reflection and interference.

The dielectric layer 3 may be comprised of not only a single layer film but also a lamination film of more than two layers.

The heat control layer 1 is deposited on the dielectric layer 3. This heat control layer 1 is comprised of a thin film of an Ag alloy such as AgPdCu alloy. The AgPdCu alloy has a high thermal conductivity and a small surface roughness. This heat control layer 1 should preferably have a film thickness ranging from 6 to 20 nm. The reason for this is that, if the thickness of the heat control layer becomes less than 6 nm, then a uniform layer is difficult to be formed and a heat cannot be diffused sufficiently. Conversely, if the film thickness of the heat control layer increases, then heat can be diffused sufficiently. However, if the film thickness of the heat control layer increases in excess of 20 nm, there is then the risk that heat will be diffused excessively so that a satisfactory recording cannot be made.

The recording layer 4 is directly deposited on the heat control layer 1. This recording layer 4 has a film thickness ranging from 5 to 30 nm. The recording layer 4 is made of amorphous rare earth-transition metal alloy such as TbFeCo and GdFeCo. When a recorded portion of a layer whose magnetization direction is normal to the film surface (hereinafter referred to as a "perpendicular magnetization layer") is locally heated by laser light and applied with a magnetic field of a reverse direction, bits are recorded on the recording layer 4.

The recording layer 4 may be comprised of not only the single layer film but also of a lamination film formed of more than two layers.

The dielectric layer 5 is deposited on the recording layer 4. This dielectric layer 5 has a thickness, a material and a function similar to those of the above dielectric layer 3.

The organic protection layer 7 is deposited on the dielectric layer 5. This organic protection layer 7 has a film thickness less than 100 (m. The organic protection layer 7 is made of a ultraviolet-curing resin.

The organic protection layer 7 may function as a protection layer for protecting the dielectric layer 5, the recording layer 4, the heat control layer 1, the dielectric layer 3 and the reflection layer 6, all of which are formed beneath it, from external circumstances such as oxygen and moisture and also may function as a protection layer for protecting the dielectric layer 5 from being smudged by dusts or the like. Further, the organic protection layer 7 may function as a protection layer for protecting these lamination layers from being damaged by other object when they are brought in contact with other object.

Even when the optical recording medium of the present invention has no organic protection layer 7 deposited thereon, it is possible to attain the object of the present invention.

Next, the manner in which information is recorded/reproduced on and from the optical recording medium according to the present invention will be described below.

Laser light 9 is irradiated on the optical recording medium 10 shown in FIG. 2 from the opposite side of the substrate 2. Due to adsorption heat of this laser light 9, the recording layer 4 is heated in excess of a Curie temperature. When the recording layer 4 is heated in excess of the Curie temperature, a coercive force of the recording layer 4 that has been magnetized so far is lowered extremely. By effectively utilizing this phenomenon, the magnetization direction of the coercive force is recorded on the recording layer 4 in the form of a positive and inverse binary notation scale.

Together with the laser light 9 which heats the recording layer 4 in excess of the Curie temperature, a magnetic field in the direction opposite to the magnetization direction of the direction a which has previously magnetized the whole of the recording layer 4 is applied to the recording layer 4. When the irradiation of the laser light 9 is interrupted, the temperature of the recording layer 4 is returned from a high temperature to a room temperature. However, if the recording layer 4 is made of the amorphous rare earth-transition metal alloy or the like, the recording layer 4 is quenched while it is recording the applied magnetic field direction obtained at the Curie temperature. Accordingly, the magnetization direction of the coercive force of only the portion applied with the laser light 9 and the external inverted magnetic field is inverted to record information.

A recorded signal can be erased by focusing and irradiating laser light again while the direction of the magnetic field applied from the outside is changed to the direction a.

When a recorded signal is reproduced, unlike the case that a signal is recorded and erased, there may be utilized a nature of the laser light 9 as waves.

While laser light emitted from a semiconductor laser is generally excellent linearly-polarized light, in order to further improve a linearly-polarized wave property, it is customary that laser light is irradiated on the recording layer of the optical recording medium through a sheet polarizer. Since a polarizing plane of laser light reflected on the recording layer 4, i.e., vibration directions of light rotate in the opposite directions depending upon the magnetization direction of the recording layer 4, information is reproduced by detecting the rotation direction.

A mutual action between lightwave and magnetic field obtained when recorded information is reproduced, i.e., a magnetooptic effect effectively utilizes a magnetic Kerr effect obtained in the case of reflected light and a Faraday effect obtained in the case of transmitted light.

The optical recording medium according to the present invention is able to at least either record or reproduce information.

The optical recording medium 10 shown in FIG. 2 is the surface reading magnetooptical recording medium as described above. According to this surface reading magnetooptical recording medium, a high-density recording becomes possible.

The reason why the high-density recording becomes possible is that, when the film thickness of the organic protection layer is decreased more than the thickness of the substrate, the numerical aperture (NA) of the lens can increase so that the size of the beam spot at the focus of the lens can decrease.

If short wavelength laser light is used as laser light and the optical system of the large numerical aperture (NA) is used as described above, then there arises a problem that an energy density of laser light in the recording layer 4 will increase considerably to decrease the Kerr rotation angle (k obtained upon reproduction, thereby causing a signal characteristic to be deteriorated. On the other hand, when the heat control layer 1 is directly deposited on the recording layer 4 having two surfaces at its side facing the substrate 2, heat can be diffused through the heat control layer 1 from a spot held at a high temperature formed on the recording layer 4 as the laser light 9 is focused. As a consequence, a temperature at the spot on the recording layer 4 can be lowered to a proper temperature. Moreover, the diffusion of heat can be carried out by the reflection layer 6 through the dielectric layer 3. Accordingly, it is possible to cause a temperature at the spot on the recording layer 4 to fall within an optimum range by properly selecting the material and film thickness of the heat control layer 1, the material and film thickness of the dielectric layer 3 and the material and film thickness of the reflection layer 6.

Next, a method of manufacturing an optical recording medium according to the present invention will be described below.

In the manufacturing method according to the present invention, first, the reflection layer 6 is deposited on the substrate 2 by sputtering. As a target used in this sputtering, there are used two sputtering targets made of an AgPdCu alloy and an Al metal simultaneously. According to this sputtering, the reflection layer 6 becomes an AgPdCuAl alloy reflection layer. A containing amount of Al contained in this reflection layer 6 is 50 weight percents.

Sputtering conditions in this reflection layer 6 are as follows:

In the Ar atmosphere, gas pressure: 0.18 Pa power

AgPdCu: 0.2 kW

Al: 0.6 kW

The reflection layer 6 made of AgPdCuAl alloy can improve a surface smoothness as compared with AgPdCu alloy (which will be described later on) although a thermal conductivity thereof is lowered a little.

The surface roughness Ra of this reflection layer 6 should preferably be selected to be less than 0.75 nm.

The containing amount of Al contained in the AgPdCuAl alloy should preferably fall within a range of from 20 to 80 weight percents.

The composition of the AgPdCu alloy target and the optimum ranges of the containing amounts of Pd and Cu contained in this AgPdCu alloy will be described later on.

The reflection layer 6 can be made of AgPdCu alloy alone. If the reflection layer 6 is made of the AgPdCu alloy, there is then the advantage that only one target may be used in the sputtering. The composition of this AgPdCu alloy, the optimum ranges of the containing amounts of Pd and Cu contained in this AgPdCu alloy, the sputtering conditions and the characteristics of the thermal conductivity and the surface property will be described later on.

Next, the dielectric layer 3 is deposited on the reflection layer 6 by sputtering. This dielectric layer 3 may be formed as a lamination layer comprised of more than two layers, if necessary.

The sputtering conditions of the dielectric layer 3 are as follows:

In a mixed atmosphere of Ar and N2, gas pressure: 0.3 to 0.4 Pa power: 1.0 to 1.5 kW Next, the heat control layer 1 is deposited on the dielectric layer 3 by sputtering. A target used in this sputtering is AgPdCu alloy, and a containing amount of Pd contained in this AgPdCu alloy is 0.92 weight percent and a containing amount of Cu contained in the AgPdCu alloy is 1.0 weight percent.

The sputtering conditions of this heat control layer 1 are as follows:

In the Ar atmosphere,
gas pressure: 0.18 Pa
power: 0.5 kW

A metal thin layer made of this AgPdCu alloy is excellent in thermal conductivity and in surface smoothness.

A surface roughness Ra of the heat control layer 1 should preferably be selected to be under 0.75 nm.

In the composition of the AgPdCu alloy, Pd should preferably fall within a range of from 0.5 to 1.5 weight percents and Cu should preferably fall within a range of from 0.5 to 1.5 weight percents.

Next, the recording layer 4 is deposited on the heat control layer 1 by sputtering. This recording layer may be formed as a lamination layer comprised of more than two layers, if necessary.

The sputtering conditions of the recording layer 4 are as follows:

Ar gas pressure: 0.2 to 0.3 Pa
two-layer film of TbFeCo and GdFeCo

Next, the dielectric layer 5 is deposited on the recording layer 4 by sputtering. This dielectric layer 5 may be formed as a lamination layer comprised of more than two layers, if necessary. The dielectric layer 5 is formed by a method similar to the above method of the dielectric layer 3.

Next, the organic protection layer 7 is deposited on the dielectric layer 5. This organic protection layer 7 is deposited on the dielectric layer 5 by spin-coating.

In order to confirm effects achieved by the optical recording medium according to the present invention, the optical recording medium according to the present invention has been evaluated as an MO medium.

The optical recording medium that had been evaluated is comprised of the substrate 2, the alloy reflection layer 6 (Ag alloy, etc.), the dielectric layer 3 (SiN, etc.), the heat control layer 1 (AgPdCu, etc.), the recording layer 4 (TbFeCo, etc.) and the dielectric layer 5 (SiN) which are laminated, in that order. To be concrete, in the evaluation, there was used the optical recording medium comprised of a substrate, an AgPdCuAl layer (50 nm), an SiN layer (20 nm), a heat control layer, i.e., AgPdCu layer (8 nm), a TbFeCo layer (12 nm), a GdFeCo layer (5 nm) and an SiN layer (60 nm) which were deposited, in that order. Further, in the evaluation of the optical recording medium, there was used a substrate having a thickness of 1.2 mm made of polycarbonate and which has a track pitch of 0.39 $\mu$m.

As described above, in order to compare characteristics, there were manufactured an optical recording medium using AgPdCu as a heat control layer (sample 1) and two samples.

Specifically, one of the above two samples is an optical recording medium using Al metal as a heat control layer (sample 2) and another one is an optical recording medium which does not include a heat control layer (sample 3). In the samples 2 and 3, conditions under which other lamination layers are formed are the same as those of the sample 1.

In the evaluation, an optical system having a numerical aperture (NA)=0.85 was used and a linear velocity was selected to be 5.6 m/s. These data were measured at groove portions of a land groove substrate.

A reproducing power Pr was selected in such a manner that Pr=0.85 mW when the heat control layer was made of AgPdCu, Pr=0.7 mW when the heat control layer was made of Al and Pr=1.0 mW when the optical recording medium had no heat control layer formed thereon. In addition, all amounts of returned light (Pull-in Level) from these samples 1, 2, 3 were made constant.

The reason why all amounts of returned light were made constant will be described below. When a reflectivity of a magnetooptical recording medium relative to laser light differs, a magnitude of a resultant noise also changes. For example, as a reflectivity increases, carriers increase and noises increase. Accordingly, even when the noise levels of magnetooptical recording mediums which are different in reflectivity are compared with each other, it is difficult to compare their noise levels relatively. Therefore, for simplicity, by making the amounts of the returned light constant, it became possible to relatively compare the noise levels of the magnetooptical recording mediums which are different in reflectivity.

As evaluation items, there were measured the erase noise and the surface roughness Ra. The erase noise level was measured by using a measuring apparatus (manufactured by ADVANTEST CORPORATION under trade name of "R3261A SPECTRUM ANALYZER"). Noise levels were measured after noises had been erased in one direction in a DC fashion.

The surface roughness Ra is what might be called a center line mean roughness. This surface roughness Ra is defined as a value obtained by dividing with a measured length L an integrated value which results from integrating an absolute value of a roughness curve when the portion of the measured length L is extracted from the roughness curve in the direction of the center line, the center line of this resultant extracted portion is expressed by X-axis, a direction of a longitudinal magnification is expressed by Y-axis and the roughness curve is expressed by y=f(x).

The surface roughness Ra was measured by using an atomic force microscope (AFM) (manufactured by DIGITAL INSTRUMENTS CO., LTD. under trade name of "SPM NANOSCOPE III").

FIGS. 3A to 3C show measured results of the erase noise levels of the above samples 1 to 3. FIG. 3A shows measured results of the erase noise level versus frequency obtained from the magnetooptical recording medium whose heat control layer is made of AgPdCu. FIG. 3B shows measured results of the erase noise level versus frequency obtained from the magnetooptical recording medium whose heat control layer is made of Al. FIG. 3C shows measured results of the erase noise level versus frequency obtained from the magnetooptical recording medium which does not include the heat control layer. In FIGS. 3A to 3C, the erase noise levels of the magnetooptical recording mediums can be relatively compared by comparing the magnitudes of the erase noise levels in a range less than the frequency of 10 MHz.

A study of FIGS. 3A to 3C reveals that the noise level of the magnetooptical recording medium with the heat control layer made of Al increases and that the noise level of the magnetooptical recording medium with the heat control layer made of AgPdCu hardly increases as compared with the magnetooptical recording medium without heat control layer.

Having measured the surface roughness Ra of the samples 1 and 2, it was confirmed that the magnetooptical recording medium with the heat control layer made of Al has the surface roughness as large as Ra=2.0 nm and that the magnetooptical recording medium with the heat control layer made of AgPdCu has the surface roughness Ra as very small as Ra=0.56 nm.

It is to be understood that the noise level changed by the heat control layer which serves as the underlayer of the recording layer (MO layer: TbFeCo, GdFeCo) in the surface reading magnetooptical recording medium is caused depending upon the surface roughness of the material of the heat control layer similarly to the case of the reflection layer.

As described above, the disk noise can be decreased by using AgPdCu as the heat control layer of the surface reading magnetooptical recording medium.

As set forth, according to the embodiment of the present invention, in the optical recording medium in which the recording layer is directly formed on the heat control layer and in which information is recorded or reproduced by irradiating laser light from the opposite side of the substrate, it is possible to obtain the heat control layer having the high thermal conductivity and the smooth surface property by using the AgPdCu alloy thin layer as the heat control layer. As a consequence, the heat characteristic can be improved and the disk noise can be reduced.

Specifically, in the surface reading magnetooptical recording medium, even when the short-wavelength laser light is used as laser light and the optical system having the large numerical aperture (NA) is used, the Kerr rotation angle (k obtained upon reproduction can be prevented from being deteriorated and carriers can be avoided from being decreased.

Even when a reflectivity of the MO medium is low, it is possible to reproduce the MO signal with application of a large reproducing power. That is, since heat can be easily diffused when the heat control layer is formed on the magnetooptical recording medium, the energy density of laser light can be increased as a result. Therefore, the present invention can sufficiently cope with a magnetooptical recording medium whose reflectivity is low.

While the so-called disk-like magnetooptical disk has been described so far in the embodiment of present invention, the present invention is not limited to the above magnetooptical disk and the above shape and can be applied to various kinds of optical recording mediums having metal thin layers in the information layer, such as a magnetooptical disk having information layers comprised of more than two layers, a phase-change optical disk having information layer comprised of a single layer or more than two layers and a card-like or sheet-like recording medium.

Furthermore, the optical recording medium according to the present invention can be modified variously such that information layers, each formed of more than two layers, are deposited on two transparent substrates, these transparent substrates are joined at their surfaces and laser light is irradiated on the information layer at its side opposite to the transparent substrate.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An optical recording medium comprising:

a reflection layer deposited on at least one substrate;

a dielectric layer deposited on said reflection layer;

a heat control layer deposited on said dielectric layer; and a recording layer directly deposited on and in contact with said heat control layer, wherein information is at least recorded on or reproduced from said recording layer with irradiation of light from the opposite side of said substrate, said heat control layer is made of an AgPdCu alloy thin layer, and said reflection layer comprises an AgPdCu-type alloy thin layer.

2. An optical recording medium according to claim 1, wherein said heat control layer has a surface roughness Ra less than 0.75 nm.

3. An optical recording medium according to claim 1, wherein said heat control layer has a surface roughness Ra less than 0.75 nm and said reflection layer has a surface roughness Ra less than 0.75 nm.

4. An optical recording medium according to claim 1, wherein said reflection layer is made of an AgPdCuAl alloy thin layer.

5. An optical recording medium according to claim 2, wherein said reflection layer is made of an AgPdCuAl alloy thin layer.

6. An optical recording medium according to claim 3, wherein said reflection layer is made of an AgPdCuAl alloy thin layer.

* * * * *